United States Patent [19]
Hammond et al.

[11] Patent Number: 5,915,087
[45] Date of Patent: Jun. 22, 1999

[54] TRANSPARENT SECURITY PROXY FOR UNRELIABLE MESSAGE EXCHANGE PROTOCOLS

[75] Inventors: Scott Hammond; Jeffery Young; Edward B. Stockwell, all of St. Paul, Minn.

[73] Assignee: Secure Computing Corporation, Roseville, Minn.

[21] Appl. No.: 08/763,933

[22] Filed: Dec. 12, 1996

[51] Int. Cl.⁶ .................................................. G06F 11/00
[52] U.S. Cl. ...................................................... 395/187.01
[58] Field of Search ........................ 395/187.01, 200.06, 395/200.59, 186, 188.01; 380/25, 4; 340/825.31, 825.34

[56] References Cited

U.S. PATENT DOCUMENTS

| | | | |
|---|---|---|---|
| 3,956,615 | 5/1976 | Anderson et al. | 235/61.7 B |
| 4,104,721 | 8/1978 | Markstein et al. | 364/200 |
| 4,177,510 | 12/1979 | Appell et al. | 364/200 |
| 4,442,484 | 4/1984 | Childs, Jr. et al. | 364/200 |
| 4,584,639 | 4/1986 | Hardy | 364/200 |
| 4,621,321 | 11/1986 | Boebert et al. | 364/200 |
| 4,648,031 | 3/1987 | Jenner | 364/200 |
| 4,701,840 | 10/1987 | Boebert et al. | 364/200 |
| 4,713,753 | 12/1987 | Boebert et al. | 364/200 |
| 4,870,571 | 9/1989 | Frink | 364/200 |
| 4,885,789 | 12/1989 | Burger | 380/25 |
| 5,093,914 | 3/1992 | Coplien et al. | 395/700 |
| 5,124,984 | 6/1992 | Engel | 3370/94.1 |
| 5,153,918 | 10/1992 | Tuai | 380/25 |
| 5,204,961 | 4/1993 | Barlow | 395/725 |
| 5,228,083 | 7/1993 | Lozowick et al. | 380/9 |
| 5,263,147 | 11/1993 | Francisco et al. | 395/425 |
| 5,272,754 | 12/1993 | Boebert | 380/25 |
| 5,276,735 | 1/1994 | Boebert et al. | 380/21 |

(List continued on next page.)

FOREIGN PATENT DOCUMENTS

| | | | |
|---|---|---|---|
| 0 554 182 A1 | 4/1993 | European Pat. Off. | H04L 29/06 |
| 0 743 777 A2 | 11/1996 | European Pat. Off. | H04L 29/06 |
| 2 287 619 | 9/1995 | United Kingdom | H04L 12/22 |
| 96/13113 | 5/1996 | WIPO | H04L 29/06 |
| 96/31035 | 10/1996 | WIPO | H04L 12/24 |
| 97/13340 | 4/1997 | WIPO | H04L 9/00 |
| 97/16911 | 5/1997 | WIPO | H04L 29/06 |
| 97/26731 | 7/1997 | WIPO | H04L 9/00 |
| 97/29413 | 8/1997 | WIPO | |

OTHER PUBLICATIONS

International Search Report, PCT Application No. PCT/US 95/12681, 8 p. (mailed Apr. 9, 1996).

News Release: "100% of Hackers Failed to Break Into One Internet Site Protected by Sidewinder™", Secure Computing Corporation (Feb. 16, 1995).

News Release: "Internet Security System Given 'Product of the Year' Award", Secure Computing Corporation (Mar. 28, 1995).

(List continued on next page.)

*Primary Examiner*—Joseph E. Palys
*Assistant Examiner*—Pierre E. Elisca
*Attorney, Agent, or Firm*—Schwegman, Lundberg, Woessner & Kluth, P.A.

[57] ABSTRACT

A proxy which is part of a firewall program controls exchanges of messages between two application entities. The proxy interrogates attempts to send a communication session by requesting entities with a server entity in accordance with defined authentication procedures. The Proxy interfaces with networking software to direct a communication stack to monitor connection messages to any address on specific ports. The requestor's address, and the server's address are extracted from the messages and checked fo compliance with a security policy such as one including an access control list. If either address is invalid, the proxy deletes the message. If both are valid, the message is relayed, and the ports used are tracked for a predetermined time. Reply messages are then sent using the address of the server entity so that the proxy is transparent to the requester.

25 Claims, 6 Drawing Sheets

U.S. PATENT DOCUMENTS

| | | | |
|---|---|---|---|
| 5,303,303 | 4/1994 | White | 380/49 |
| 5,305,385 | 4/1994 | Schanning et al. | 380/49 |
| 5,311,593 | 5/1994 | Carmi | 380/23 |
| 5,329,623 | 7/1994 | Smith et al. | 395/275 |
| 5,333,266 | 7/1994 | Boaz et al. | 395/200 |
| 5,355,474 | 10/1994 | Thuraisngham et al. | 395/600 |
| 5,414,833 | 5/1995 | Hershey et al. | 395/575 |
| 5,416,842 | 5/1995 | Aziz | 380/30 |
| 5,485,460 | 1/1996 | Schrier et al. | 370/94.1 |
| 5,511,122 | 4/1996 | Atkinson | 380/25 |
| 5,530,758 | 6/1996 | Marino, Jr. et al. | 380/49 |
| 5,548,646 | 8/1996 | Aziz et al. | 380/23 |
| 5,550,984 | 8/1996 | Gelb | 395/200.17 |
| 5,566,170 | 10/1996 | Bakke et al. | 370/60 |
| 5,583,940 | 12/1996 | Vidrascu et al. | 380/49 |
| 5,586,260 | 12/1996 | Hu | 395/200.59 |
| 5,604,490 | 2/1997 | Blakley, III et al. | 340/825.31 |
| 5,606,668 | 2/1997 | Shwed | 395/200.11 |
| 5,608,720 | 3/1997 | Biegel et al. | 370/249 |
| 5,615,340 | 3/1997 | Dai et al. | 395/200.17 |
| 5,619,648 | 4/1997 | Canale et al. | 395/200.01 |
| 5,623,601 | 4/1997 | Vu | 395/187.01 |
| 5,636,371 | 6/1997 | Yu | 395/500 |
| 5,644,571 | 7/1997 | Seaman | 370/401 |
| 5,671,279 | 9/1997 | Elgamal | 380/23 |
| 5,673,322 | 9/1997 | Pepe et al. | 380/49 |
| 5,684,951 | 11/1997 | Goldman et al. | 395/188.01 |
| 5,689,566 | 11/1997 | Nguyen | 380/25 |
| 5,699,513 | 3/1995 | Feigen et al. | 395/187.01 |
| 5,720,035 | 2/1998 | Allegre et al. | 395/200.06 |
| 5,781,550 | 7/1998 | Templin et al. | 370/401 |

OTHER PUBLICATIONS

News Release: "Satan No Threat to Sidewinder (tm)", Secure Computing Corporation (Apr. 26, 1995).

"Answers to Frequently Asked Questions About Network Security", *Secure Computing Corporation*, pp. 1–41 & pp. 1–16 (Sep. 25, 1994).

"Sidewinder Internals", Product information, Secure Computing Corporation, 16 p. (Oct. 1994).

"Special Report: Secure Computing Corporation and Network Security", *Computer Select*, 13 p. (Dec. 1995).

Adam, J.A., "Meta–Matrices", *IEEE Spectrum*, p. 26 (Oct. 1992).

Adam, J.A., "Playing on the Net", *IEEE Spectrum*, p. 29 (Oct. 1992).

Ancilotti, P., et al., "Language Features for Access Control", *IEEE Transactions on Software Engineering*, SE–9, 16–25 (Jan. 1983).

Atkinson, R., "IP Authentication Header", Network Working Group, Request For Comment No. 1826, http//ds.internic.net/rfc/rfc1826.txt, 9 p. (Aug. 1995).

Atkinson, R., "IP Encapsulating Security Payload (ESP)", Network Working Group, Request For Comment No. 1827, http//ds.internic.net/rfc/rfc1827.txt, 12 p. (Aug. 1995).

Atkinson, R., "Security Architecture for the Internet Protocol", Network Working Group, Request for Comment No. 1825, http//ds.internic.net/rfc/ rfc1825.txt, 21 p. (Aug. 1995).

Baclace, P.E., "Competitive Agents for Information Filtering", *Communications of the ACM*, 35, 50 (Dec. 1992).

Badger, L., et al., "Practical Domain and Type Enforcement for UNIX", *Proceedings of the 1995 IEEE Symposium on Security and Privacy*, pp. 66–77 (May 1995).

Belkin, N.J., et al., "Information Filtering and Information Retrieval: Two Sides of the Same Coin?", *Communications of the ACM*, 35, 29–38 (Dec. 1992).

Bellovin, S.M., et al., "Network Firewalls", *IEEE Communications Magazine*, 32, 50–57 (Sep. 1994).

Bevier, W.R., et al., "Connection Policies and Controlled Interference", *Proceedings of the Eighth IEEE Computer Security Foundations Workshop*, Kenmare, Ireland, pp. 167–176 (Jun. 13–15, 1995).

Bowen, T.F., et al., "The Datacycle Architecture", *Communications of the ACM*, 35, 71–81 (Dec. 1992).

Bryan, J., "Firewalls For Sale", *BYTE*, 99–100, 102, 104–105 (Apr. 1995).

Cobb, S., "Establishing Firewall Policy", *IEEE*, 198–205 (1996).

Damashek, M., "Gauging Similarity with n–Grams: Language–Independent Categorization of Text", *Science*, 267, 843–848 (Feb. 10, 1995).

Dillaway, B.B., et al., "A Practical Design For A Multilevel Secure Database Management System", *American Institute of Aeronautics and Astronautics, Inc.*, pp. 44–57 (Dec. 1986).

Fine, T., et al., "Assuring Distributed Trusted Mach", *Proceedings of the IEEE Computer Society Symposium on Research in Security and Privacy*, pp. 206–218 (1993).

Foltz, P.W., et al., "Personalized Information Delivery: An Analysis of Information Filtering Methods", *Communications of the ACM*, 35, 51–60 (Dec. 1992).

Gassman, B., "Internet Security, and Firewalls Protection on the Internet", *IEEE*, 93–107 (1996).

Goldberg, D., et al., "Using Collaborative Filtering to Weave an Information Tapestry", *Communications of the ACM*, 35, 61–70 (Dec. 1992).

Grampp, F.T., "UNIX Operating System Security", *AT&T Bell Laboratories Technical Journal*, 63, 1649–1672 (Oct. 1984).

Greenwald, M., et al., "Designing an Academic Firewall: Policy, Practice, and Experience with SURF", *IEEE*, 79–92 (1996).

Haigh, J.T., et al., "Extending the Noninterference Version of MLS for SAT", *Proceedings of the 1986 IEEE Symposium on Security and Privacy*, Oakland, CA, pp. 232–239 (Apr. 7–9, 1986).

Karn, P., et al., "The ESP DES–CBC Transform", Network Working Group, Request for Comment No. 1829, http//ds.internic.net/rfc/rfc1829.txt, 9 p. (Aug. 1995).

Kent, S.T., "Internet Privacy Enhanced Mail", *Communications of the ACM*, 36, 48–60 (Aug. 1993).

Lampson, B.W., et al., "Dynamic Protection Structures", *AFIPS Conference Proceedings*, 35, 1969 Fall Joint Computer Conference, Las Vegas, NV, 27–38 (Nov. 18–20, 1969).

Lee, K.C., et al., "A Framework for Controlling Cooperative Agents", *Computer*, 8–16 (Jul. 1993).

Loeb, S., "Architecting Personalized Delivery of Multimedia Information", *Communications of the ACM*, 35, 39–48 (1992).

Loeb, S., et al., "Information Filtering", *Communications of the ACM*, 35, 26–28 (Dec. 1992).

McCarthy, S.P., "Hey Hackers! Secure Computing Says You Can't Break into This Telnet Site", *Computer Select*, 2 p. (Dec. 1995).

Merenbloom, P., "Network 'Fire Walls' Safeguard LAN Data from Outside Intrusion", *Infoworld*, pp. 69 & addnl. page (July 25, 1994).

Metzger, P., et al., "IP Authentication using Keyed MD5", Network Working Group, Request for Comments No. 1828, http//ds.internic.net/rfc/rfc1828.txt, 5 p. (Aug. 1995).

Obraczka, K., et al., "Internet Resource Discovery Services", *Computer*, 8–22 (Sep. 1993).

Press, L., "The Net: Progress and Opportunity", *Communications of the ACM*, 35, 21–25 (Dec. 1992).

Schroeder, M.D., et al., "A Hardware Architecture for Implementing Protection Rings", *Communications of the ACM*, 15, 157–170 (Mar. 1972).

Schwartz, M.F., "Internet Resource Discovery at the University of Colorado", *Computer*, 25–35 (Sep. 1993).

Smith, R.E., "Constructing a High Assurance Mail Guard", Secure Computing Corporation (Appeared in the Proceedings of the National Computer Security Conference), 7 p. (1994).

Smith, R.E., "Sidewinder: Defense in Depth Using Type Enforcement", *International Journal of Network Management*, pp. 219–229 (Jul.–Aug. 1995).

Stadnyk, I., et al., "Modeling User's Interests in Information Filters", *Communications of the ACM*, 35, 49–50 (Dec. 1992).

Stempel, S., "IpAccess—An Internet Service Access System for Firewall Installations", *IEEE*, 31–41 (1995).

Stevens, C., "Automating the Creation of Information Filters", *Communications of the ACM*, 35, 48 (Dec. 1992).

Thomsen, D., "Type Enforcement: The New Security Model", *SPIE*, 2617, 143–150 (1995).

Warrier, U.S., et al., "A Platform for Heterogeneous Interconnection Network Management", *IEEE Journal on Selected Areas in Communications*, 8, 119–126 (Jan. 1990).

White, L.J., et al., "A Firewall Concept for Both Control-Flow and Data-Flow in Regression Integration Testing", *IEEE*, 262–271 (1992).

Wolfe, A., "Honeywell Builds Hardware for Computer Security", *Electronics*, 14–15 (Sep. 2, 1985).

Peterson, Larry L. and Bruce S. Davie, "*Computer Networks*", selected Internetworking and Protocol pp., 218–221, 284–286, (1996, Morgan Kaufmann Publishers, Inc.).

| SOURCE ADDRESS AND PORT | DESTINATION ADDRESS AND PORT | RETURN ADDRESS AND PORT | TIME OUT |
|---|---|---|---|
| aaa.aaa.aa.a 123 | bbb.bbb.bb.b 123 | ccc.ccc.cc.c 999 | 23.41 OUT |
| ddd.ddd.dd.d 327 | eee.eee.ee.e 419 | fff.fff.ff.f 113 | 00.25 |

```
UDP proxy pseudocode: ~410 record table_entry { ~412
  source_address;
  source_port;
  destination_address;
  destination_port_;
  return_address;
  return_port;
  timeout;
}
variable connection_table : array of table_entry procedure handle_server_response(message) { ~414
  variable index;

index = reverse_connection_table_lookup( ~416
            source_address(message),
            source_port(message),
            destination_address(message),
            destination_port(message));
                                            ~418
  if (index was found) {
    send message from source_address(message) and
      source_port(message) to
      connection_table[index].source_address and
      connection_table[index].source_port;
```

FIG. 4A

} else {
    discard the message; ~420
}
} procedure handle_client_request_(message) { ~424
    variable index;

index _ connection_table_lookup( ~426
        source_address(message),
        source_port(message),
        destination_address(message),
        destination_port(message));

428 ~ if (index was not found) {
        /* comment: virtual connection is not set up yet */
        index = add_connection_to_table(~430
            source_address(message),
            source_port(message),
            destination_address(message),
            destination_port(message));
        connection_table[index].return_port = ~432
            get_new_random_port();
        connection_,table[index].return_address = ~434
            local address on the destination network;
    }
    send message from connection_table[index].return_port ~436
        and connection_table[index].return_address to
        destination_address(message) and

FIG. 4B

```
destination_port(message);
} procedure main_loop() { ~ 440
variable message, portset;

listen to ports in set portset; ~ 442
/* comment: portset contains the ports that we want to proxy */ repeat forever { ~ 444
    message = wait_for_message_or_connection_timeout();
    if (there was a timeout) { ~ 446
        release the return_port for that connection
        and delete the connection from the table;
        continue loop; /* comment : go back to repeat */
    }
    if (security_checks_pass(message)) { ~ 450
        if (destination_port(message) is in portset) { ~ 452
            handle_client_request(message);
        } else {
            handle_server_response(message); ~ 454
        }
    } else
        discard message; ~ 456
    }
} else
}
```

FIG. 4C

TRANSPARENT SECURITY PROXY FOR UNRELIABLE MESSAGE EXCHANGE PROTOCOLS

FIELD OF THE INVENTION

The present invention relates to network security systems and in particular to a security system for securely exhchanging messages using unreliable protocols.

BACKGROUND OF THE INVENTION

Networks connect many computers together allowing them to exchange data via communications lines. Several standards defining how such data exchanges should occur have been developed and implemented to ensure that computers and computer programs using the same protocols can successfully exchange data. One of the problems associated with the ability to exchange data is ensuring that a requestor entity, such as a user on a network, sometimes referred to as a client, is authorized to send messages to and to receive data from a server entity, such as another computer.

Firewalls are devices, such as programs or separate computer systems which were introduced in order to address the security problems associated with connecting a once private network such as a local area network connecting computers in an office, to an "Internet", where the data transmissions are open to eaves dropping, and the potential exists for "hostile" outsiders to disrupt network service or tamper with or attack systems residing on the private network.

There are a number of different classes of firewalls, each designed to address different types of security concerns. In spite of the different approaches, all firewalls perform a function know as "relaying", where Protocol Data Units (PDUs) are received by the firewall from a sending application entity and forwarded to a receiving application entity, possibly with some modifications to the original PDU. Since firewalls are designed to enforce a security policy, some information, or context, must be extracted from the PDUs and subjected to a set of rules. Based on the outcome of the rules check, the firewall performs an action; the PDU is either relayed, modified and relayed, or rejected in some fashion. The precise action is chosen by the designer of the firewall in order to affect the behavior of the system such that the security policy is satisfied. The action is of course subject to the constraints of the protocol the firewall is designed to support.

The Internet uses a simple transport protocol to provide a process to process communication service called User Datagram Protocol (UDP.) UDP is a protocol for processes to exchange datagrams such as messages between processes coupled via a network, Internet Protocol (IP) in this case. One important feature of the UDP protocol is that there is no assurance that a message will get through. It is said to be an unreliable communications protocol for this reason. No continuous connection is established, and since there is no maintenance of the states of messages to ensure delivery, there is very little overhead in implementing the UDP communication protocol. It is suitable for transfer of data such as network video, where there is no desire to spend time reconstructing lost frames of live video, and for audio communications, where the same considerations apply.

Processes communicating using UDP indirectly indentify each other using an abstract locator, often called a port or mailbox of a known host device along with the address of the host. Many common processes receive messages at fixed ports on each device on which they run. One process, known as a Domain Name Server (DNS) receives messages at port 53 for example. Following a first communication at such a port, processes may then agree on a different port number, which frees up the original port for other processes. A configuration file contains a list of hosts and ports which packets should be relayed between.

This points to a difficulty in implementing firewalls which protect servers from illegal messages. The firewall must find a way to accept messages that are not addressed to it. There is a need for this to be done with further multilevel checking of the messages without confusing the processes attempting to communicate. There is a further need to do this without modifying the client that is sending and receiving messages.

SUMMARY OF THE INVENTION

A proxy for unreliable message based protocol communication systems accepts messages from a requesting process on a client that are intended for a server with a different address than a host on which the proxy is running. It also sends messages back to the client, using the address of the server. The proxy interrogates messages sent by the requestor in accordance with defined authentication procedures. In one embodiment, the proxy transparently receives and forwards messages in accordance with a defined security policy. Messages are interrogated for conformance to desired protocols, and optionally further decoded to add additional application specific filtering.

In one embodiment, the proxy comprises a monolithic computer program which interfaces with a dual stack networking firewall which monitors the requestor's address which is extracted directly from the message and checks the address against an access control list. If the address is invalid, the proxy causes the message to be deleted. Since the requestor does not see the proxy, it does not need to be modified to work with the proxy. The dual stack refers to the division of the firewall into an external stack and an internal stack. The external stack deals with communications coming in from external computer systems, and the internal stack handles communications with internal systems coupled to the internal stack that the firewall is designed to protect. The monolithic nature of the proxy arrises from the fact that it sits on top of both stacks and is able to communicate with both stacks via a single, or monolithic process. This means that only one process is needed for the proxy. Multiple instances of the process may be operating, one for each session of messages to be transferred between a requester and server. This avoids the consumption of significant resources exhibited by non-monolithic prior proxies when many sessions are operating.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

There has been an explosion in the growth of computer networks as organizations realize the benefits of networking their personal computers and workstations. Increasingly, these networks are falling prey to malicious outsiders who hack into the network, reading and sometimes destroying sensitive information. Exposure to such attacks has increased as companies connect to outside systems such as the Internet.

To protect themselves from attacks by malicious outsiders, organizations are turning to mechanisms for increasing network security. One such mechanism is described in "SYSTEM AND METHOD FOR PROVIDING SECURE INTERNETWORK SERVICES", U.S. patent application Ser. No. 08/322,078 filed Oct. 12, 1994 by Boebert et al., the discussion of which is hereby incorporated by reference. Boebert teaches that modifications can be made to the kernel of an operating system in order to add type enforcement protections. Type enforcement adds an additional level of protection to the process of accessing files. This is quite helpful for a BSD 4.4 UNIX type operating system wherein once a process receives privileges, it uses those privileges to access other network files. This can lead to a dangerous breach of network security. Boebert further teaches a secure computer that is used to connect a private network having a plurality of workstations to a public network. A protocol package such as TCP/IP running on the secure computer implements a communications protocol used to communicate between each workstation and the secure computer.

Program code running on the secure computer is used to communicate through the private network to the workstation's protocol package. In one embodiment, the secure computer is an Intel Pentium-based machine running a hardened form of BSD/OS Unix. A system based on a 90 Mhz Pentium microprocessor with 32 megabytes of memory, 2 gigabytes of hard disk space, a DAT tape for backup and a CD-ROM for software loads has been found to be adequate. Likewise, program code running on the secure computer is used to communicate through a public network interface to a public network such as the Internet. In an Internet embodiment, the program code used to communicate with the Internet is part of a set of Internet protocols which communicate with computers on the Internet through an Internet connection. In one embodiment, different protocols may be used when communicating with different entities on the Internet In one embodiment, a top wrapper package operating in the Internet protocols is used to sit on the external, public network so that information about external problems can be logged. Such a system is currently being sold under the brand name, Sidewinder, by the assignee hereof. Certain aspects of the Sidewinder product related to dual stack network separation are further described in "SYSTEM AND METHOD FOR ACHIEVING NETWORK SEPARATION", U.S. patent application Ser. No. 08/599,232 filed Feb. 9, 1996, the discussion of which is hereby incorporated by reference. Internal and external networks are separated by have using separate stacks in programming separated into internal and external burbs. A security manager sits at the top of the stacks and ensures that communications between the burbs are checked for predetermined secure characteristics before being transferred to the other burb.

The use of access control lists to check whether an entity is authorized to communicate with another entity is described in "GENERALIZED SECURITY POLICY MANAGEMENT SYSTEM AND METHOD", U.S. patent application Ser. No. 08/715,668, filed Sep. 18, 1996 and assigned to the same assignee hereof, the discussion of which is hereby incorporated by reference. In essence, a security monitor maintains an address based access control list used to identify authorized clients from which message receipt is acceptable.

Figure 1:
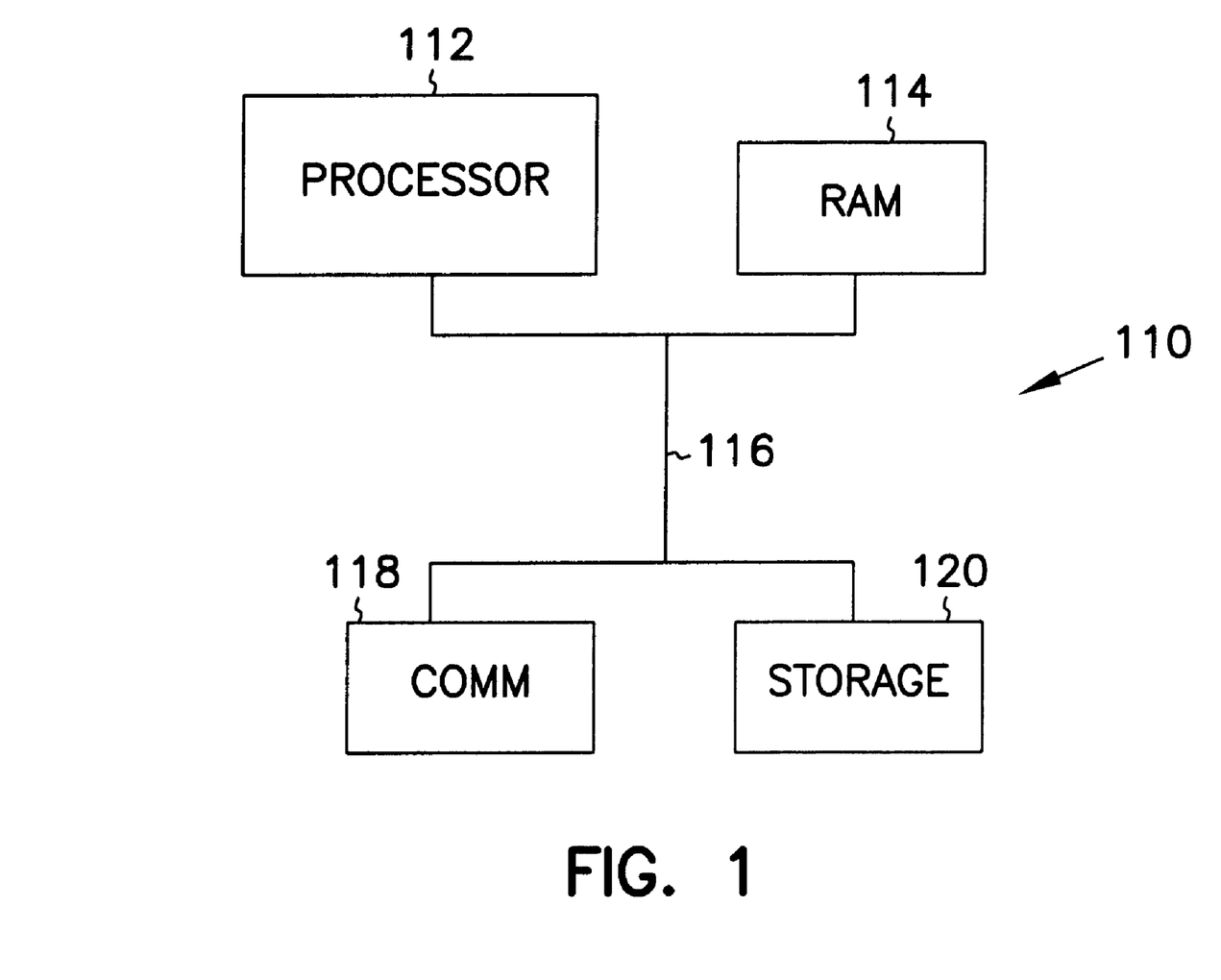
FIG. 1 is a block diagram of a computer system implementing the present invention.

The current invention is an extension to the Sidewinder product. As shown in FIG. 1 generally at 110, a network communication controller such as a computer system comprises a processor 112 coupled to a random access memory, RAM 114. While only a single bus 116 is shown connecting the RAM 114 and processor 112 to a communications port 118 and disk drive or other storage medium 120, it will be recognized by those skilled in the art that it represents several different busses in a standard personal computer architecture. The communications port represents various communications options in computer systems, such as ethernet cards, modems and other communication devices.

Figure 2:
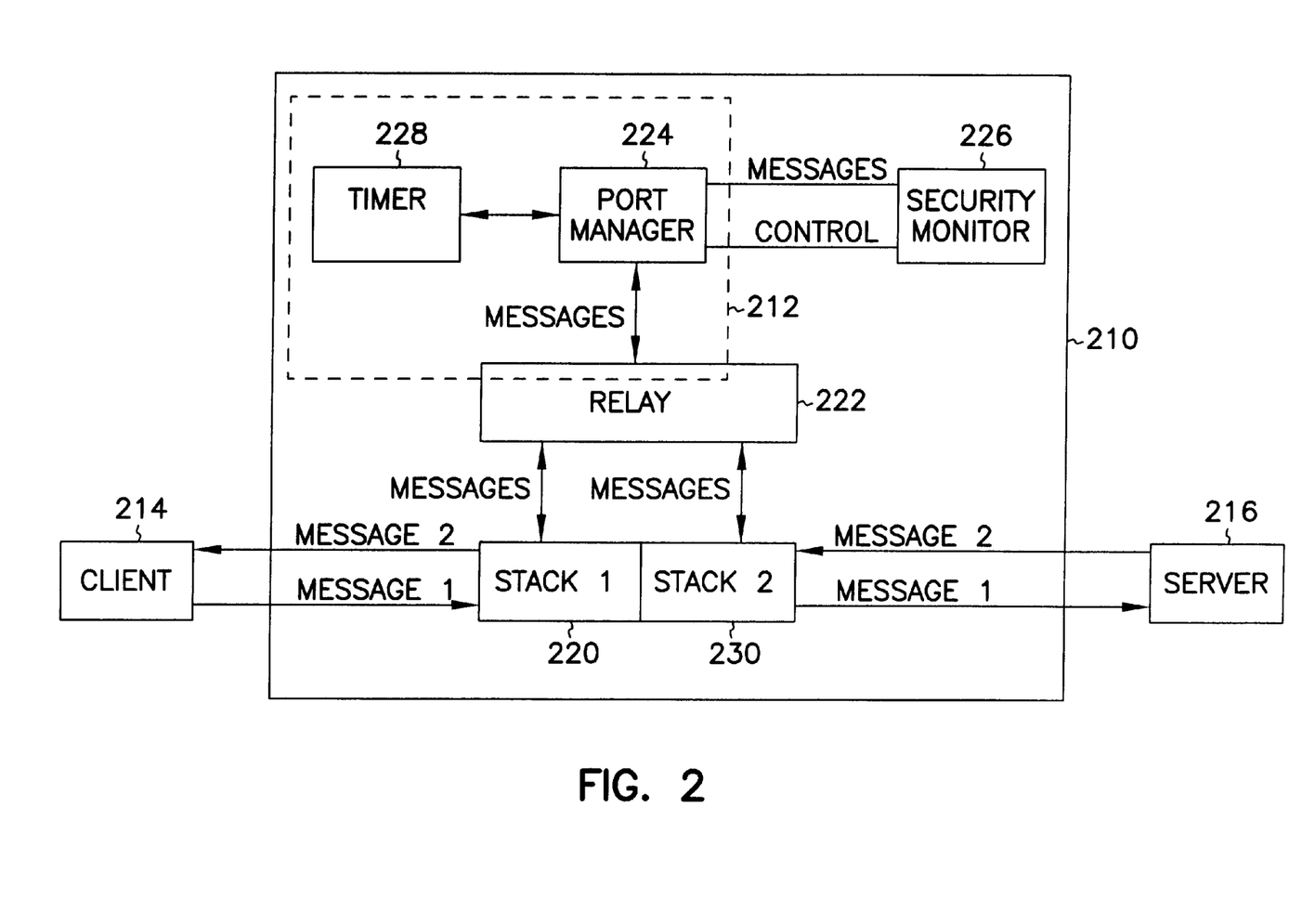
FIG. 2 is a combined block diagram and logical message flow diagram of one embodiment of the present invention.

In FIG. 2, operation of an improved firewall product comprising an improved computer program extension to the Sidewinder product is indicated generally in block representation at 210. The computer program is usually stored on the disk drive 120 and run or executed on top of an operating system running on the processor 112 out of RAM 114. It should be noted that disk drive 120 is used herein to represent various storage medium by which the computer program 210 may be stored and distributed. It also represents a communication medium in which the proxy may be temporarily stored while being transferred or transmitted to computer system 110. Computer program 210 further comprises a proxy 212 which is used to process communications between processes. Also shown in FIG. 2 are a client 214 and server 216 which each have processes thereon trying to communicate using a UDP protocol for sending datagrams comprising messages. They also may communicate using other protocols, but the embodiments herein will be described with respect to message exchange using unreliable communication protocols such as UDP on top of IP.

Processes communicating using UDP indirectly indentify each other using an abstract locator, often called a port or mailbox of a known host or server device along with an IP address of the host. Many common processes receive messages at fixed ports on each device they run on. The Domain Name Server (DNS) receives messages at port 53 for example. Following a first communication at such a port, processes may then agree on a different port number, which frees up the original port for other processes. Note that there is no connection that is maintained. The message is sent by a client or server, and the underlying network does its best to route it to the correct host using a destination address and port contained in the message.

The Sidewinder security system provides the ability to accept messages intended for selected servers. Each UDP datagram or message comprises a packet with a header and data. Among the fields of the header are the length of the packet, the protocol identifier-17 for UDP, a checksum, and importantly for the embodiments of the invention described, a source address and port identifier and a destination address and port identifier. The Sidewinder security system has networking modifications which allow it to accept a message intended for any destination address.

Messages, such as message 1, from client 214 intended for a server attached to the firewall are received at a first stack 220 even though the firewall has a different address than the server. The firewall simply keeps a list of addresses of server attached to it, and accepts all messages intended for such servers. They are then relayed by a relay 222 to a port manager 224 which receives the message, and requests the operating system to bind it to a port which may be based on an address in the message if it is not already so bound. A security monitor 226 is operatively coupled to the port manager 224 to monitor messages from clients for conformance to predefined conditions and to prevent the further routing of non conforming messages. A timer represented at 228 provides a time stamp to time how long a port is being held open waiting for further messages from either the client or the server. A link table 310, shown in FIG. 3 keeps track of which ports are currently bound and hence monitored for further messages, and also provides mapping for routing of messages with desired addresses.

Referring to FIG. 2 again, if a message is approved for sending on to the server 216, a new port is bound if not already bound, and noted in the link table. The message is then sent via relay 222 to a second stack 230 with an address and port identifying it as originating from firewall 210. The message is then sent on to the intended server 216. The server may respond to the message, but will use the address and port used by the firewall. The orignal client is transparent to the server, which only knows of the firewall.

When and if the server 216 responds to the message via a message 2, it uses the address and port specified by the firewall. The port manager uses the link table to monitor for messages on specific ports identified in the table. Alternatively, the operating system may maintain a separate table and provide such monitoring. In any event, the link table is then used to identify the original client address and port, as well as the address and port of the firewall on which the first message was recieved from the client. The proxy then causes those addresses to be used in sending the reply message from the server on through the stacks and relay to the client. In essence, it spoofs the addresses such that the message appears to the client to have originated from the server. In essence, the network addressing structure of the server remains unknown to the client, providing security to the message exchange.

In one practical embodiment, the client may be a laptop computer system used by a user to contact the home office internal network by means of a public network such as the Internet. By going through the firewall to get to the server, little if any information is exposed about the internal network attached to the server.

Figure 3:
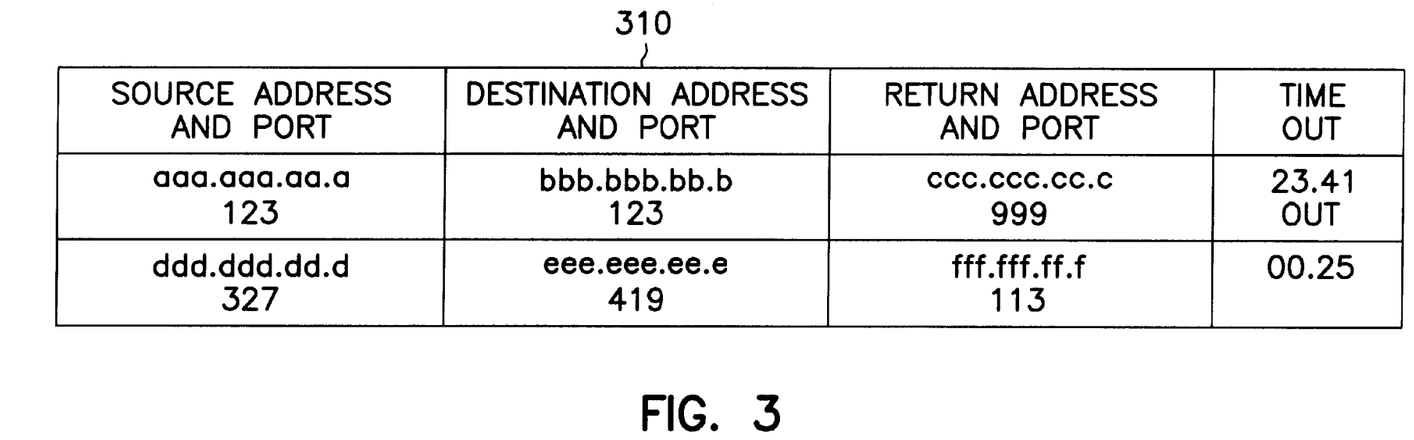
FIG. 3 is a logical block diagram of a table used to track message flow and ports for the embodiment of FIG. 2.

As depicted in FIG. 3, the link table tracks which ports are bound on both sides of the firewall, and ensures that messages are properly routed via the correct ports. The first entry in the table comprises the source address, "aaa.aaa.aa.a", of a client, and the port, "122" on which the client will look for a response if any. The second address in the table, "bbb.bbb.bb.b" comprises the destination address of the message, corresponding to the server. Port 123 is requested. The third address in the first row of the table comprises the address on which the firewall will be expecting a reply from the server. This address is assigned by the firewall after receipt of the message. A time of "23.41" seconds is indicated. Note that the time may be an expired amount of time from when the message was originally recieved, or any other type of timing mechanism, such as a time when the port should be released, or some other indication for identifying when to release a port. In essence, it helps to manage a virtual connection comprising a series of ports being held open to facilitate communication between processes running on the server and the client.

Figure 4A:
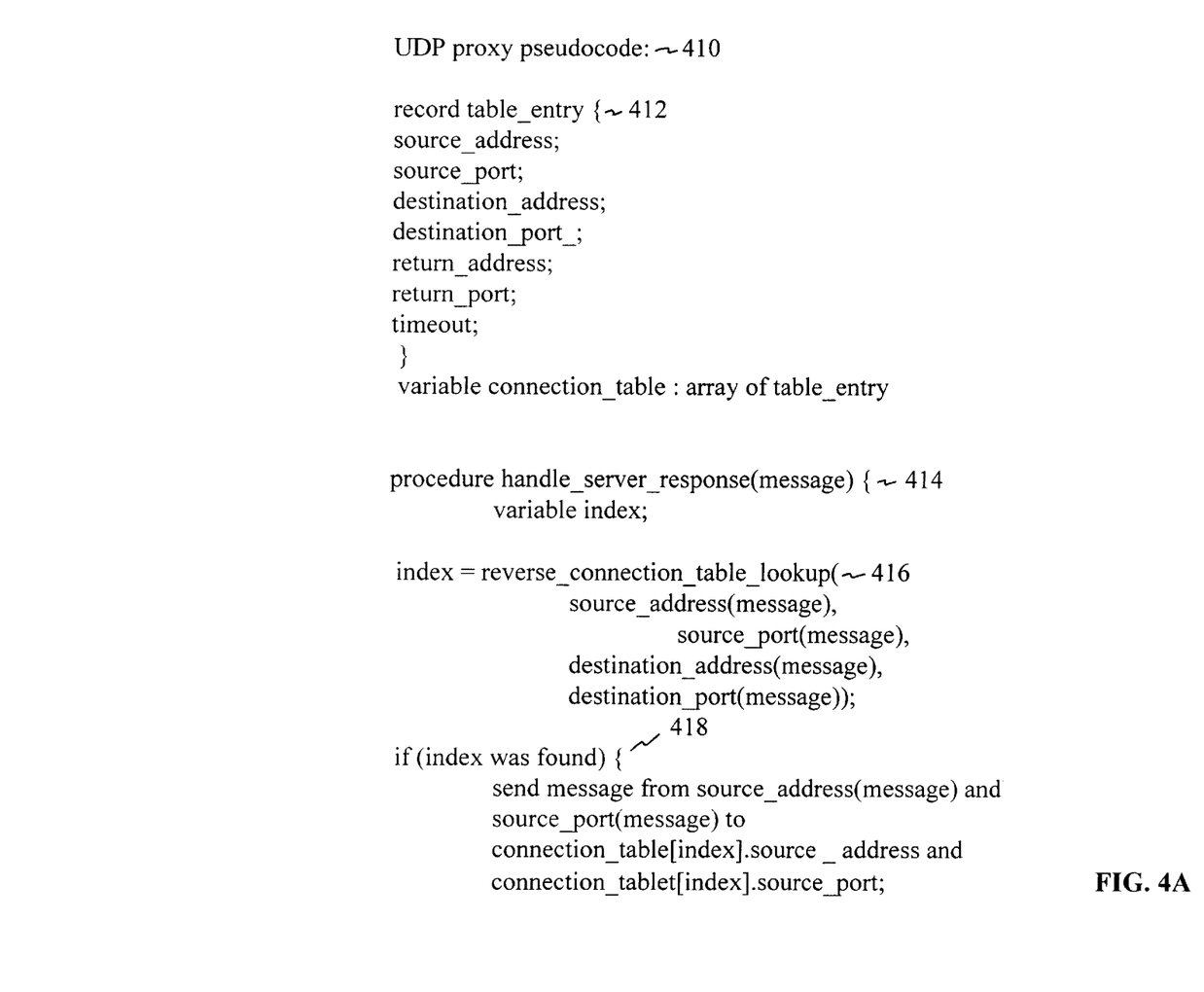
FIGS. 4a–c are pseudo code flow diagrams of a proxy operating on the computer system of FIG. 1 which controls message flow.
Figure 4B:
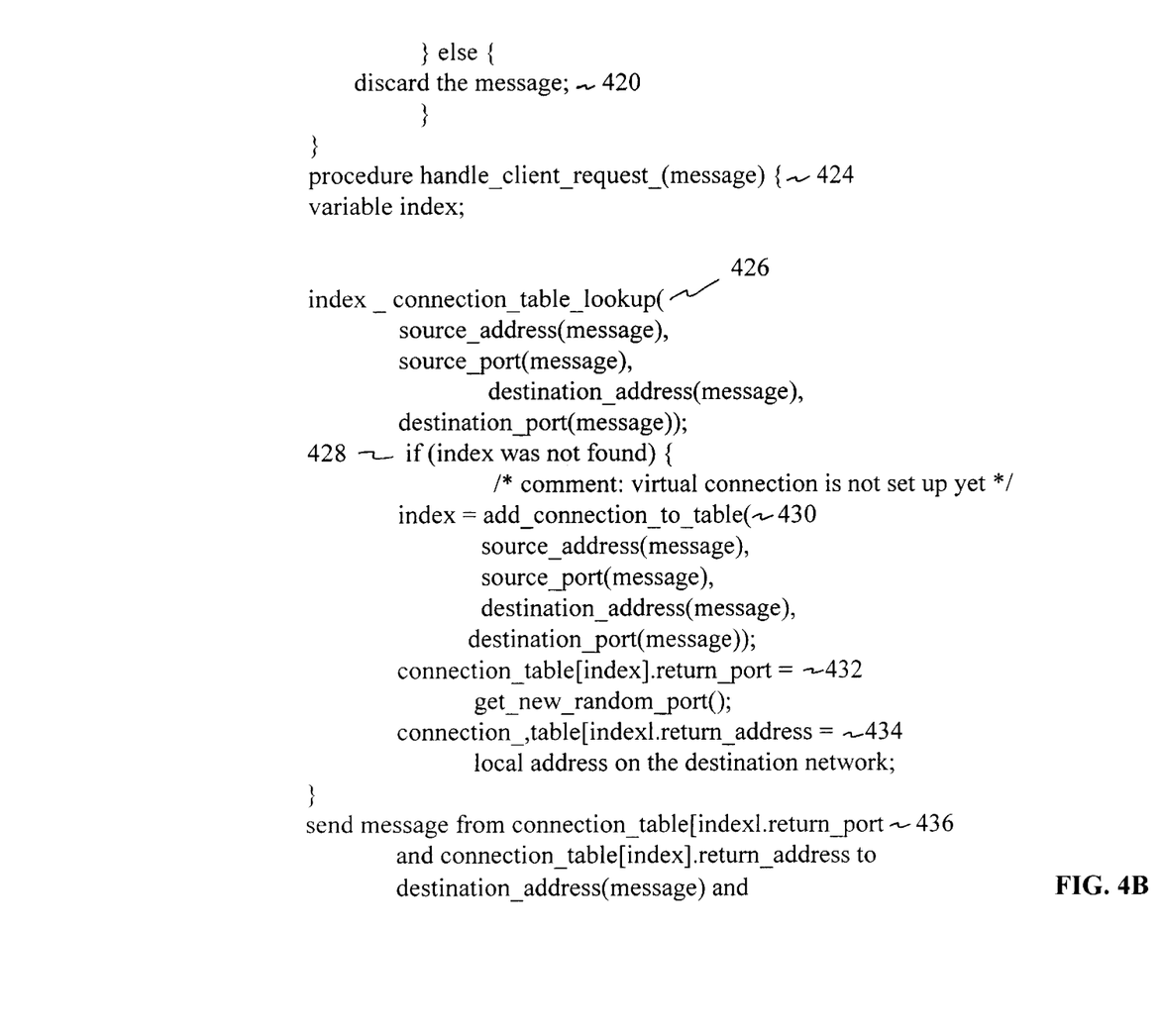
Figure 4C:
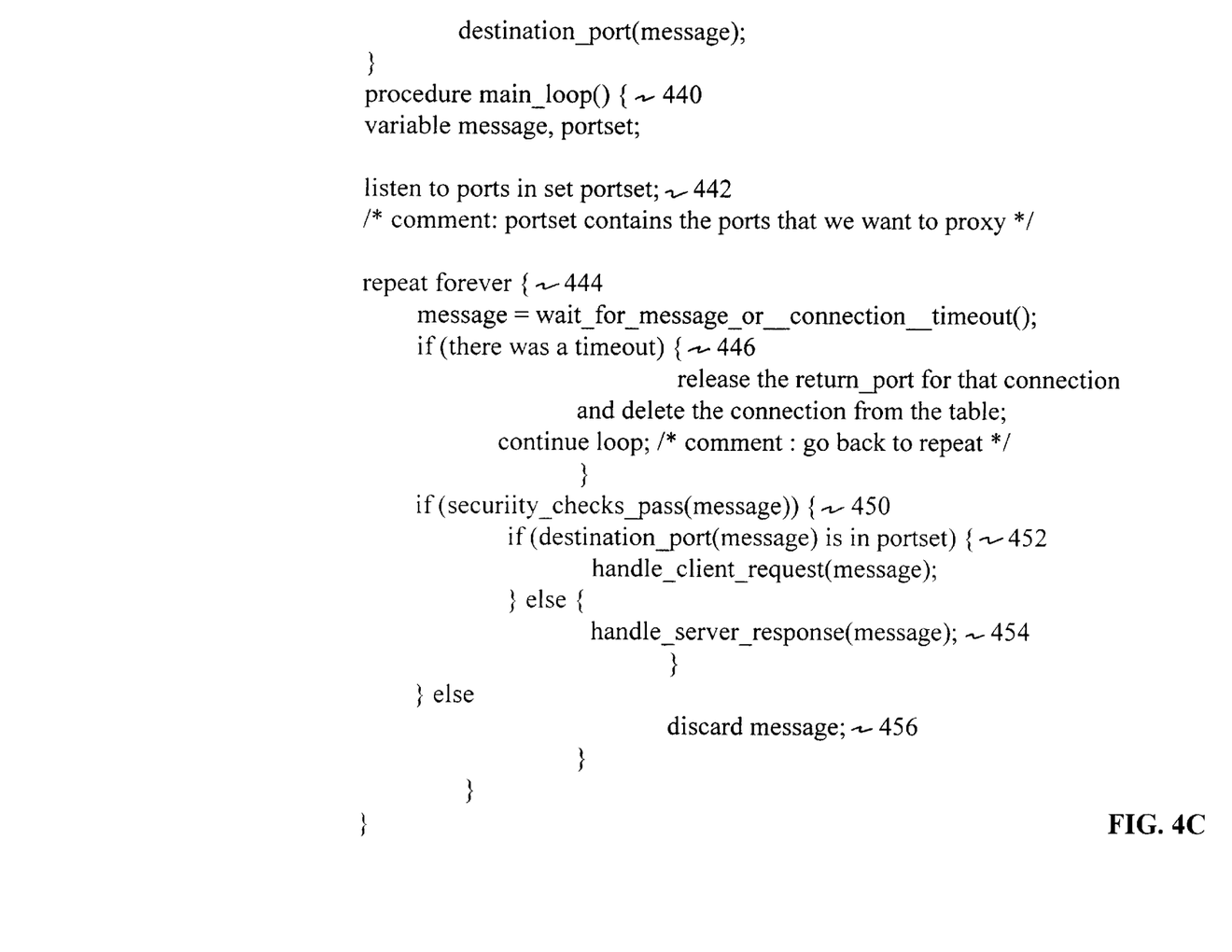

Programming to accomplish the above described transfer of messages is described with reference to pseudocode shown in FIGS. 4a, 4b and 4c. The pseudocode is representative of monolithic programming residing on an improved Sidewinder product as described in the pending applications previously incorporated by reference. Note that the pseudocode depicts one embodiment of the invention, and may or may not match up one for one with the previous block diagram of FIG. 2 which is meant to describe the invention is functional terms as opposed to the procedural representation provided by the pseudocode. The programming was written in the C language and is referred to as the UDP proxy beginning at 410. A separate process is not initiated for each communcation, but rather variables are tracked in tables. This requires much less in terms of system resources. Alternatively, a separate process can be initiated for each communication.

At 412, the structure of the link table 310 is established. The start of a message receive procedure is indicated at 414. At 416, the link table is indexed to determine if there is a virtual connection between the server and a client open. If there is, the message is forwarded to the client using the source and destination addresses and port identified in the link table 310. If not, the message is discarded at 420.

A client request message is handled by a procedure beginning at 424. Again, the link table is indexed to determine if a virtual connection is already established at 426. If not 428, one is set up beginning at 430. In addition, a return address and port are obtained at 432 and 434 respectively. The message is then sent at 436, using the return address and port.

A main procedure begins at 440, where ports in the link table, referred to as a port set in the pseudocode, are monitored or listened to at 442. In a repeat loop 444, the return port is released and deleted from the table at 446 if there was a timeout. Security checking is also performed at 450 during the repeat. If the security check is passed, and if a destination port identified in a client message is in the port set, it is handled at 424. If not in the port set, it is assumed to be a server response and is handled at 414. If the security check fails, the message is discarded at 456.

It is to be understood that the above description is intended to be illustrative, and not restrictive. While the invention has been described with reference to various embodiments, many other embodiments will be apparent to those of skill in the art upon reviewing the above description. For instance, the invention has been described mainly with reference to the UDP protocol for message exchange most commonly used on the Internet. The invention will also be useful with any other inherently unreliable connectionless message transfer protocol which might use different types of addressing and port or other hardwired or virtual types of identifying where a message should be expected. The scope of the invention should, therefore, be determined with reference to the appended claims, along with the fill scope of equivalents to which such claims are entitled.

What is claimed is:

1. A network communication manager comprising:
   a port manager that:
   receives a client message intended for a selected server;
   assigns such message to a port based on an address in the message;
   sends the message to the intended server; and
   routes a reply message from the server to the client while identifying the reply message as originating from the server; and a security monitor, operatively coupled to the port manager that monitors messages from the clients for conformance to predefined conditions and prevents the further sending of non conforming messages wherein the port manager is interposed between the security monitor and the server.

2. The network communication manager of claim 1 wherein the port manager further comprises a relay that relays messages from the client to the server.

3. The network communication manager of claim 1 and further comprising:
   a timer coupled to the port manager that provides a time stamp; and
   a link table which is modified by the port manager for tracking ports that messages used, and storing time stamps representative of the times that messages are received.

4. The network communication manager of claim 3 wherein the port manager maintains a virtual connection between the client and the server based on the time stamp and tracked ports.

5. The network communication manager of claim I wherein the security monitor maintains an access control list used to identify authorized clients from which message receipt is acceptable.

6. The network communication manager of claim 5 wherein messages are deleted if they do not originate from an authorized client.

7. The network communication manager of claim 1 wherein the port manager comprises a proxy running on a firewall having a network protocol stack, wherein the network protocol stack includes an Internet Protocol (IP) layer.

8. The network communication manager of claim 1 wherein the proxy comprises a monolithic multithreaded computer program.

9. The network communication manager of claim 8 wherein the port manager binds the port, specific to message transfer between the client and server.

10. A network communication manager for a firewall which intercepts messages addressed to one or more servers coupled to the firewall, the network communication manager comprising:
    a port manager that receives messages from a requesting entity addressed to a server entity;
    a security monitor, operatively coupled to the port manager that monitors messages received from the requesting entity for conformance to supported protocol standards and adherence to a defined security policy; and
    a relay, operatively coupled to the security monitor, that relays messages from the requesting entity to the server entity using an address of the firewall, responsive to the security monitor and to addresses in the messages, Relays messages from the server entity addressed to the firewall to the requesting entity inserting the address of the server entity in such messages.

11. The network communication manager of claim 10 and further comprising:
    a timer coupled to the port manager that provides a time stamp; and
    a link table which is modified by the port manager for tracking ports that messages used, and storing time stamps representative of the times that messages are received.

12. The network communication manager of claim 11 wherein the port manager maintains a virtual connection between the client and the server based on the time stamp and tracked ports.

13. The network communication manager of claim 10 wherein the security monitor maintains an access control list used to identify authorized clients from which message receipt is acceptable and wherein the security monitor accesses the access control list using the server address in the message.

14. The network communication manager of claim 13 wherein messages are deleted by the security monitor if they do not originate from an authorized client.

15. The network communication manager of claim 10 wherein the port manager comprises a proxy running on a firewall having a network protocol stack, wherein the network protocol stack includes an Internet Protocol (IP) layer.

16. The network communication manager of claim 10 wherein the proxy comprises a monolithic multithreaded computer program.

17. The network communication manager of claim 16 wherein the port manager binds the port, and binds a secondary socket specific to message transfer between the client and server.

18. A method of ensuring secure message transfer between a requesting application on one host and a serving application on another host coupled by a network using an unreliable protocol by use of a proxy on a firewall between the hosts, comprising the steps of:
    receiving a message from the requesting application intended for the serving application;
    monitoring the message from the requesting application for conformance to a selected communication protocol;
    relaying the message from the requesting application to the serving application based on a server address in the message and responsive to the conformance of the message to the selected communication protocol while making the message appear as if it originated from the firewall; and
    relaying a reply message from the serving application to the requesting application having the address of the serving entity encapsulated in the message as an address of origin.

19. The method of claim 18 and further comprising the steps of:
    checking an address of the requesting entity against a list of authorized addresses; and
    deleting the message if the address is not authorized.

20. The method of claim 19 and further comprising the steps of
    binding a port on which the message from the requesting application was received; and
    binding a secondary port specific to message transfer between the client application and server application.

21. A storage medium having a computer program stored thereon for causing a suitably programmed system to ensure secure message transfer using a connectionless communication protocol between a requesting application entity and a serving application entity, by performing the following steps when such program is executed on the system:
    receiving a message from the requesting application intended for the serving application;
    monitoring the message from the requesting application for conformance to a selected communication protocol;
    relaying the message from the requesting application to the serving application based on a server address imbedded in the message and responsive to the conformance of the message to the selected communication protocol while making the message appear as if it originated from the system; and relaying a reply message from the serving application to the requesting application having the address of the serving entity imbedded in the message as an address of origin.

22. The storage medium of claim 21 wherein the computer program comprises programming for further causing the system to perform the following additional steps when such program is executed on the system:

binding a port on which the message from the requesting application was received; and binding a secondary port specific to message transfer between the client application and server application.

23. The storage medium of claim 21 wherein the computer program comprises programming for further causing the system to perform the following additional steps when such program is executed on the system:

checking an address of the requesting entity against a list of authorized addresses; and modifying the response to the requesting entity based on the check.

24. A network communication controller, comprising:

a processor;

a memory coupled to the processor;

a communications device operatively coupled to the processor and to the memory wherein the communications device provides multiple ports that receive messages; and a firewall module operatively coupled to the processor that implements with the processor a communications protocol that controls connectionless message transfer between a requestor and a server via the communications device ports, wherein the firewall module further comprises:

a port manager that receives messages from a requestor addressed to a server;

a security monitor, operatively coupled to the port manager that monitors messages received from the requestor for conformance to supported protocol standards and adherence to a defined security policy; and a relay, operatively coupled to the security monitor, that relays messages from the requestor to the server based on a server address incorporated in each message and responsive to the security monitor while using an address of the communication controller and relays messages from the server which are addressed to the communication controller to the requesting entity imbedding the address of the server entity in such messages.

25. The network communication controller of claim 24 wherein the communication protocol is a dual stack communication protocol which places communication between the processor and the server and the processor and the requestor in first and second burbs respectively.

* * * * *